United States Patent

House

[15] 3,655,431
[45] Apr. 11, 1972

[54] CEILING TILE CARRYING ANTI-SAG COATING

[72] Inventor: Ronald Raymond House, Darien, Conn.
[73] Assignee: American Cyanamid Company, Stamford, Conn.
[22] Filed: June 2, 1969
[21] Appl. No.: 829,706

[52] U.S. Cl. ................. 117/126 R, 117/143 R, 117/161 LN
[51] Int. Cl. ......................................................... C03c 25/02
[58] Field of Search ............ 117/126 O, 126 R, 126 G, 12 GR, 117/126 GO, 143, 145, 161 LN; 260/17.5, 17.3

[56] References Cited

UNITED STATES PATENTS

| | | | |
|---|---|---|---|
| 2,197,357 | 4/1940 | Widmer et al. | 260/72 |
| 2,648,641 | 8/1953 | Robison | 260/17.3 UX |
| 3,082,180 | 3/1963 | Boldizar et al. | 260/17.3 |
| 3,243,340 | 3/1966 | Cadotte | 117/126 X |
| 3,380,842 | 4/1968 | Watson | 117/161 X |
| 3,472,804 | 10/1969 | Nobile et al. | 260/17.3 |
| 3,524,763 | 8/1970 | Taravella et al. | 117/126 X |

Primary Examiner—William D. Martin
Assistant Examiner—Bernard D. Pianalto
Attorney—Evans Kahn

[57] ABSTRACT

The sag resistance of ceiling tile of the "lay in" type coated with a melamine-formaldehyde-carbohydrate resin (wherein the weight of the carbohydrate is up to one-half the weight of the melamine-formaldehyde) is about the same as the sag resistance of ceiling tile coated with an all melamine-formaldehyde resin. The presence of carbohydrate permits a cheapening of the product and in preferred instances an improvement in performance.

7 Claims, No Drawings

CEILING TILE CARRYING ANTI-SAG COATING

The present invention relates to ceiling tile of the lay in type which carries a coating to decrease its tendency to sag, and to processes for the manufacture of said tile.

Ceiling tiles of the lay-in type are large thin oblongs (typically 40 × 25 × 1/2 inches) of interfelted fibrous material, and may carry a multitude of perforations for absorption of sound. They are laid in hangers suspended from ceilings, and consequently are supported only by their edges. The tiles generally carry a resin coating to prevent sag, which is particularly apt to occur under conditions of high temperature and humidity. Tiles which have sagged present a poor appearance and may fall.

The coating (when on the topside of the tile) acts as a skin which holds the center part of the tile in tension and thereby provides needed support. When on the underside of the tile the coating acts as a member in compression. Melamine-formaldehyde resin has been used to provide the coating, but a coating composed of this resin is a significant item in the cost of the tile, and a cheaper sag-resistant tile has been eagerly sought.

The discovery has now been made that ceiling tile of the lay-in type possesses excellent sag resistance when it carries a coating on one side only of a normally water-soluble thermosetting melamine-formaldehyde-carbohydrate resin in thermoset state, wherein the weight of the carbohydrate is between about one-fifth and one-half of the weight of the melamine-formaldehyde component. I have found that the resulting tile possesses substantially as good (and in preferred instances far superior) sag-resistance than ceiling tile which carries on all melamine-formaldehyde resin coating (i.e., a coating containing no carbohydrate). Evidently the carbohydrate is not merely a substitute for the melamine-formaldehyde component, but acts as a fortifying agent therefor. Since carbohydrate material is inexpensive compared to melamine-formaldehyde resin, the present invention permits a cheapening in the cost of the tile.

The invention is surprising because carbohydrates are hygroscopic, and it was not expected that a hygroscopic material could act as a substitute for melamine-formaldehyde resins in the present connection.

The tile of the present invention is prepared by applying to one surface of ceiling tile an aqueous solution of a thermosetting melamine-formaldehyde resin containing about one-fifth to one-half (based on the fry weight of the resin) of a suitable carbohydrate, and heating the tile to dry the solution and thermocure the resin coating thereon. Only one surface of the tile is coated.

The syrup is applied at a sufficiently high viscosity that penetration of the resin into the inner part of the tile is minimized. Sufficient of the syrup is applied so that the final tile possesses a useful anti-sag coating (i.e. a coating which decreases the sag by at least about one-third). Typically such coating weighs 5 to 30 lb. per 1,000 square feet of surface.

The anti-sag properties of the syrup commence to fall off significantly when more than about one-half of the weight of the melamine-formaldehyde component is replaced by carbohydrate, so that this represents about the upper limit. Replacement of one-fifth of the melamine-formaldehyde component with carbohydrate represents about the smallest amount which it is worthwhile to replace, so that this represents about the lower practical limit.

Suitable carbohydrates include sucrose, glucose, fructose, invert starch, boiled starch, partially hydrolyzed starch, enzyme-solubilized starch, and the water-soluble cationic starches. In general any carbohydrate is suitable which is soluble in water or which becomes so when boiled in water.

The carbohydrate may be present in the resin syrup in unreacted state (and thus unboiled corn starch may be used), but a shorter curing time generally results when the starch is partially reacted with melamine-formaldehyde resin so that the syrup (when applied to the tile) is a water-soluble thermosetting composition in homogeneous pre-polymer state.

The coating solution when applied to the tile advantageously contains an acid catalyst which may be a strong mineral acid or an acid salt. If preferred, the catalyst may be of the laten type, i.e., a salt which is neutral in aqueous solution at room temperature but which develops acidity on heating, for example isopropanolamine sulfate, or ammonium phosphate.

The syrup may contain a minor proportion (not in excess of the weight of the melamine-formaldehyde component) of other water-soluble thermosetting amidogen-aldehyde resins which may or may not have a reacted content or one or more than one water-soluble carbohydrates. Suitable amidogens include urea, guanidine, biuret, and acetoguanamine.

The syrups are conveniently prepared by adding one or more water-soluble carbohydrates (or one or more carbohydrates which become soluble when boiled in water) to a melamine-formaldehyde reaction mixture and heating the mixture thereby causing the components to interact to form a unitary water-soluble thermosetting resin, or by adding the carbohydrate to an aqueous solution of a performed melamine-formaldehyde resin [trimethylolmelamine, hexamethylolmelamine, tri(methoxymethyl) malamine, etc.]. If desired, the mixture can be heated to cause the carbohydrate to react, forming a similar unitary soluble pre-polymer.

The foregoing resin solutions are advantageously prepared at high solids content (and therefore at a sufficiently high viscosity) to permit their application to a fibrous surface, without substantial penetration of the resin syrup into the interior of the board. The tile is then heated for an appropriate time at an appropriate temperature to thermoset the resin thereon (i.e., to convert it to water-insoluble state).

The tiles of the present invention possess about the same resistance to sagging when one side carries a coating of the resin as when both sides are coated. Accordingly, the invention contemplates that only one side of the tile will be coated.

There is a criticality in the sides which carry the single coating. In the case of tiles wholly or substantially composed of mineral fibers, best stiffening is achieved when the coating is on the backside of the tile, that is, on the side which is "up" when the tile is laid in the hanger. In the case of tiles wholly or substantially composed of cellulose fibers, best stiffening is achieved when the coating is on the face of the tile, that is, when it is on the surface which is "down" when the tile is laid in the hanger.

The invention is further illustrated in the examples which follow. These examples constitute specific embodiments of the invention and are not to be construed as limitations thereon.

EXAMPLE 1

To a 40 percent by weight solution of a thermosetting melamine-formaldehyde resin [tri(methoxymethyl)melamine] at pH 8.5 and at 30° C. is added slowly with stirring increments of a 40 percent by weight solution of sucrose in water; samples are withdrawn as the addition proceeds when the weight of the sucrose is 25 percent, 33 percent, and 43 percent of the weight of the melamine-formaldehyde (equivalent to weight ratios of 80:20, 75:25 and 70:30). The samples are clear syrups.

A second set of syrups is prepared in the same manner except that a 40 percent by weight solution of corn syrup in water (an aqueous solution of partially hydrolyzed starch) is used in place of the sucrose solution.

A third set of samples is prepared using as the melamine resin a 40 percent by weight aqueous solution of a 1:1 molar ratio mixture of tri(methoxymethyl) melamine and methylated dimethylolurea in water, and a 40 percent by weight solution of corn syrup in water as the carbohydrate.

A fourth set of samples is prepared in the same manner as the third set except that a 40 percent by weight solution of sucrose in water is employed in place of the corn syrup.

A fifth set is prepared in the same manner as the first set except that a 40 percent by weight solution of boiled corn starch in water is employed in place of the sucrose.

All solutions are adjusted to 40 percent solids (dry basis) by addition or evaporation of water, and 5 percent of an acid catalyst (ammonium chloride in sets 3 and 4 and magnesium chloride in sets 1, 2 and 5) is added to each.

The solutions are coated on the face side of 2 × 22 × 1/2 inches strips cut from an all-cellulose fiber ceiling tile material at a rate to provide 10 lbs. of the solids per 1,000 ft.$^2$ of tile surface.

The resulting strips carrying the anti-sag coatings are placed for 1 minute in a laboratory oven at 260° F. to dry the resin coating and to cure the resin to water-insoluble state (with simultaneous reaction of the carbohydrate with the melamine-formaldehyde component). The strips are then placed on their sides and conditioned at 50 percent relative humidity and 73° F. for three days.

The sag properties of the resulting strips are determined by supporting each end of the strips horizontally on a ceiling tile support for 72 hours at 95 percent relative humidity and 95° F. and then for 24 hours at 50 percent relative humidity and 73° F., the coated sides being down. The total deflection (sag) of the strips is then measured at the saidpoint of the resulting span of about 21 inches.

An untreated strip is tested (control A) and a strip which has been coated in the same manner by application of a 40 percent by weight solution of tri(methoxymethyl)melamine (control B).

Results are as follows:

COATING COMPONENTS

| Set No. | Names [1] | Weight ratio | Sag inches |
|---|---|---|---|
| Control A | None | | 0.650 |
| Control B | TMMM | | 0.200 |
| 1 | TMMM-sucrose | 80:20 | 0.170 |
| | | 75:25 | 0.091 |
| | | 70:30 | 0.000 |
| 2 | TMMM-corn syrup | 80:20 | 0.158 |
| | | 75:25 | 0.105 |
| | | 70:30 | 0.000 |
| 3 | {TMMM / MDMU} corn syrup | 80:20 | 0.306 |
| | | 75:25 | 0.277 |
| | | 70:30 | 0.250 |
| 4 | {TMMM / MDMU} sucrose | 80:20 | 0.298 |
| | | 75:25 | 0.266 |
| | | 70:30 | 0.249 |
| 5 | TMMM-corn starch | 80:20 | 0.350 |
| | | 75:25 | 0.315 |
| | | 70:30 | 0.290 |

[1] TMMM = tri(methoxymethyl)melamine.
MDMU = methylolated dimethylolurea.
Corn syrup = aqueous solution of partially hydrolyzed corn starch.
Corn starch = boiled corn starch.

EXAMPLE 2

The procedure of Example 1 is repeated, except that the test strips used are 2 × 22 × 5/8 inches strips cut from an all mineral fiber tile material, tri(hydroxymethyl) melamine is used as the melamine component, dimethylolurea is used as the urea component, and the coated strips are coated on their backsides and are tested with their coated sides up. Results are as follows:

COATING COMPONENTS

| Set No. | Names [1] | Weight ratio | Sag inches |
|---|---|---|---|
| Control A | None | | 0.580 |
| Control B | TMM | | 0.160 |
| 1 | TMMM- sucrose | 80:20 | 0.030 |
| | | 75:25 | 0.040 |
| | | 70:30 | 0.034 |
| 2 | TMMM-corn syrup | 80:20 | 0.036 |
| | | 75:25 | 0.031 |
| | | 70:30 | 0.030 |
| 3 | {TMM / DMU} corn syrup | 80:20 | 0.048 |
| | | 75:25 | 0.041 |
| | | 70:30 | 0.038 |
| 4 | {TMM / DMU} sucrose | 80:20 | 0.050 |
| | | 75:25 | 0.042 |
| | | 70:30 | 0.046 |
| 5 | TMM-corn starch | 80:20 | 0.058 |
| | | 75:25 | 0.052 |
| | | 70:30 | 0.046 |

[1] TMM = trimethylolmelamine.
Corn syrup = aqueous solution of partially hydrolyzed corn starch.
Corn starch = boiled corn starch.

EXAMPLE 3

The following illustrates the comparative anti-sag properties possessed by tile of the present invention which carries a resin coating on one side as compared with similar tile which carries a coating on both sides.

The procedure for the preparation of coated cellulose tile according to run 1 of Example 1 and the procedure for the preparation of coated mineral tile according to run 1 of Example 1 are repeated.

In each instance the resin solution is applied at a rate to provide 10 pounds of the solution per 1,000 ft.$^2$ of tile surface. The resulting strips are tested as described in Example 1, the coatings (in the case of the strips coated on one side only) being positioned as shown in the table below.

Control values are obtained from strips which carry no coating.

| No. | Tile material | Sides coated | Position of coating [1] | Sag inches |
|---|---|---|---|---|
| Control | Cellulose | | | 0.650 |
| 1 | do | Both | | 0.495 |
| 2 | do | One | Down | 0.200 |
| 3 | do | One | Up | 0.750 |
| Control | Mineral fiber | | | 0.580 |
| 4 | do | Both | | 0.350 |
| 5 | do | One | Down | 0.750 |
| 6 | do | One | Up | 0.075 |

[1] During the sag test.

Best results are obtained with strips 2 and 6 (which carry only one coating).

I claim:

1. Ceiling tile composed of interfelted cellulose fibers or mineral fibers, said tile carrying on its down side only when composed of cellulose fibers and on its up side only when composed of mineral fibers an anti-sag coating of a normally water-soluble thermosetting melamine-formaldehyde-carbohydrate resin in thermoset state, the weight of carbohydrate in said resin being between one-fifth and one-half of the weight of the melamine-formaldehyde in said resin.

2. Ceiling tile according to claim 1 wherein the interfelted fibers are cellulose fibers and the anti-sag coating is on the down side only of said tile.

3. Ceiling tile according to claim 1 wherein the interfelted fibers are mineral fibers and the anti-sag coating is on the up side of said tile.

4. Tile according to claim 1 wherein the coating is a melamine-formaldehyde-sucrose resin. (i.e., 5. Tile according to claim 1 wherein the resin is a melamine-formaldehyde-glucose resin.

6. Tile according to claim 1 wherein the resin is a melamine-formaldehyde-starch resin.

7. Tile according to claim 1 wherein the resin is a melamine-formaldehyde-partially hydrolyzed starch resin.

* * * * *

Case 21,680

UNITED STATES PATENT OFFICE
CERTIFICATE OF CORRECTION

Patent No. 3,655,431    Dated April 11, 1972

Inventor(s) RONALD RAYMOND HOUSE

It is certified that error appears in the above-identified patent and that said Letters Patent are hereby corrected as shown below:

Column 1 line 9, before "hangers" insert -- a --. Column 2 line 4 "laten" should read -- latent --; Column 2 line 22, "malamine" should read -- melamine --; Column 2 line 40, before "hanger" insert -- a --. Column 3 line 17, before "ceiling" insert -- a --; Column 3 line 71 in the table, run 1 "TMMM-sucrose" should read -- TMM-sucrose --. Column 4 line 2 in the table, run 2 "TMMM-corn syrup" should read -- TMM-corn syrup --; Column 4 line 14 in footnote 1, insert -- DMU=dimethylolurea --; Column 4 line 40 in the table, "Nineral fiber" should read -- Mineral fiber --. Claim 4 line 65, Delete "(i.e.,".

Signed and sealed this 25th day of July 1972.

(SEAL)
Attest:

EDWARD M. FLETCHER, JR.              ROBERT GOTTSCHALK
Attesting Officer                    Commissioner of Patents